US005456442A

United States Patent [19]

Sutton et al.

[11] Patent Number: 5,456,442

[45] Date of Patent: Oct. 10, 1995

[54] MOUNTING BRACKET FOR GLOBAL POSITIONING SYSTEM ANTENNA

[75] Inventors: Laurie D. Sutton, Point Mugu, Calif.; Ralph M. Kleber, Lisbon, Me.

[73] Assignee: The United States of America as represented by the Secretary of the Navy, Washington, D.C.

[21] Appl. No.: 108,132

[22] Filed: Aug. 12, 1993

[51] Int. Cl.$^6$ ........ F16M 13/00

[52] U.S. Cl. ........ 248/534; 343/878; 248/539

[58] Field of Search ........ 248/534, 539, 248/511, 536; 343/878, 892, 888, 705, 707, 708, 713, 711

[56] References Cited

U.S. PATENT DOCUMENTS

| | | | |
|---|---|---|---|
| 1,883,508 | 10/1932 | Bonday | 248/539 X |
| 2,122,902 | 7/1938 | Whistlecroft | 343/707 X |
| 2,285,588 | 6/1942 | Kirkes | 343/711 X |
| 2,727,766 | 12/1955 | Grashow | 343/888 X |
| 2,767,240 | 10/1956 | Webster et al. | 248/536 X |
| 2,790,023 | 4/1957 | Keller | 343/705 X |
| 2,795,642 | 6/1957 | Fritzinger | 248/511 X |
| 3,184,745 | 5/1965 | Betcher | 343/705 |
| 3,664,617 | 5/1972 | Fenwick | 248/539 |
| 3,893,122 | 7/1975 | Feeney | 343/705 |

FOREIGN PATENT DOCUMENTS

| | | | |
|---|---|---|---|
| 614911 | 12/1926 | France | 248/539 |

*Primary Examiner*—Karen J. Chotkowski

*Attorney, Agent, or Firm*—David Kalmbaugh; Melvin J. Sliwka

[57] ABSTRACT

A mounting bracket for mounting a Global Positioning Antenna to the fuselage of a fixed wing aircraft. The apparatus comprises a rectangular shaped mounting plate having a cylindrical shaped member positioned in the center of the mounting plate and extending from its bottom surface. There is an aperture extending through the cylindrical shaped member and the plate through which the antenna cable passes with the cable connecting the antenna to the receiver. The antenna mounting bracket is secured to the aircraft by inserting the cylindrical shaped member into the sextant port of the airframe so that the bottom portion of the cylindrical shaped member including a pinning aperture extends into the interior the aircraft. A quick release pin is inserted in the pinning aperture to tightly secure the antenna to the airframe.

5 Claims, 2 Drawing Sheets

MOUNTING BRACKET FOR GLOBAL POSITIONING SYSTEM ANTENNA

BACKGROUND OF THE INVENTION

1. Field of the Invention

This invention relates generally to Global Positioning System (GPS) antennas and, in particular, this invention relates to a mounting bracket for a GPS antenna to be positioned on an aircraft.

2. Description of the Prior Art

Global Positioning System (GPS) is a space-based positioning and velocity system for determining the worldwide position and velocity of a craft, such as a wheeled or tracked vehicle, an amphibian, or watercraft. Global Positioning System has three major segments: space (transmitting satellites), control and user equipment (receiver). The GPS is predicated upon accurate and continuous knowledge of the spatial position of each satellite in the system, with respect to time and distance from a transmitting antenna to the user. Each satellite transmits its unique ephemeris data. This data is periodically updated by a master control station based upon information obtained from widely dispersed monitor stations. The GPS receiver automatically selects appropriate signals from the three or four satellites best in the field of view of the receiver based on optimum satellite-to-user geometry. The receiver then solves time of arrival difference quantities to obtain the distance between the user and satellites. This information establishes the user position with respect to the satellite system. A time correction factor then relates the satellite system. The user equipment measures four independent pseudo ranges and range rates and translates these to three-dimensional position and velocity information.

The receiver includes a standardized antenna mounted on the aircraft generally in a location on the airframe fuselage which will allow for the least airframe blockage and thus distortion of any incoming satellite transmitted signals. On fixed wing aircraft, the antenna should be mounted above the cabin near the front of the aircraft and as close to the centerline of the fuselage as possible. In addition, the GPS antenna should be mounted on a flat plane relative to the aircraft fuselage. This, in turn, provides optimum line of sight for the GPS antenna allowing GPS antennas to receive transmissions from GPS satellites without distorting incoming signals.

One prior art method for mounting a GPS antenna to a fixed wing aircraft required the user to drill antenna mounting holes and an electrical connector opening in the airframe of the aircraft, install the antenna and then use a sealant, such as RTV, to seal around the antenna base and the screw holes.

Another prior art apparatus and method of mounting a GPS antenna to a fixed wing aircraft required the user to use a large flat steel plate as the antenna support structure having an aperture therein, weld a stainless steel tube to the bottom of the antenna support structure which is aligned with the aperture, attach the GPS antenna to the antenna support structure using mounting screws and then secure the antenna support structure to the airframe by inserting the tube into the sextant port of the airframe so that the bottom portion of the tube including a pinning aperture extends into the interior the aircraft. A pin is inserted in the pinning aperture to secure the GPS antenna to the airframe.

These prior art apparatus and methods of securing a GPS antenna to fixed wing aircraft leave something to be desired in that it is undesirable to drill mounting holes within the airframe of the aircraft, the seals are susceptible to failure causing pressure loss within the aircraft, the antenna support structure may corrode and aerodynamic drag on the aircraft may increase and vibration or even breakage of the GPS antenna may occur. Such breakage of the GPS antenna renders the aircraft's Global Positioning System inoperable and requires the replacement of a GPS antenna which is expensive.

SUMMARY OF THE INVENTION

With the disadvantages inherent in prior art method and apparatus for mounting a GPS antenna to a fixed wing aircraft the present invention was conceived. Generally, the apparatus of the present invention is an antenna mounting bracket for mounting a GPS antenna on the upper portion of the fuselage of a fixed wing aircraft. The antenna mounting bracket of the present invention consists essentially of a rectangular shaped plate having a cylindrical shaped member extending from the bottom of the plate and positioned in the center of the plate. The GPS antenna is mounted on the upper surface of the rectangular shaped plate. There is an aperture extending through the cylindrical shaped member and the plate through which the GPS antenna cable passes with the cable connecting the GPS antenna to the receiver. The antenna mounting bracket is secured to the aircraft by inserting the cylindrical shaped member into the sextant port or very pistol port of the airframe so that the bottom portion of the cylindrical shaped member including a pinning aperture extends into the interior the aircraft. A quick release pin is inserted in the pinning aperture to tightly secure the GPS antenna to the airframe.

An object of the present invention is to provide an antenna mounting structure for mounting a GPS antenna to the fuselage of a fixed wing aircraft.

Another object of the present invention is to provide an antenna mounting structure which provides for rapid attachment and removal of the GPS antenna from the aircraft.

Still another object of the present invention is to provide a mounting bracket which resists breakage of the antenna and the electrical antenna connecter.

Yet another object of the invention is to provide an antenna mount which is aerodynamically compatible with the airframe structure of the aircraft.

Various other advantages and objectives of the present invention will become apparent to those skilled in the art as a more detailed description of the invention is set forth below.

DETAILED DESCRIPTION OF THE PREFERRED EMBODIMENT

The detailed description of the preferred embodiment of the present invention will now be discussed in conjunction with all of the figures of the drawings.

Figure 1:
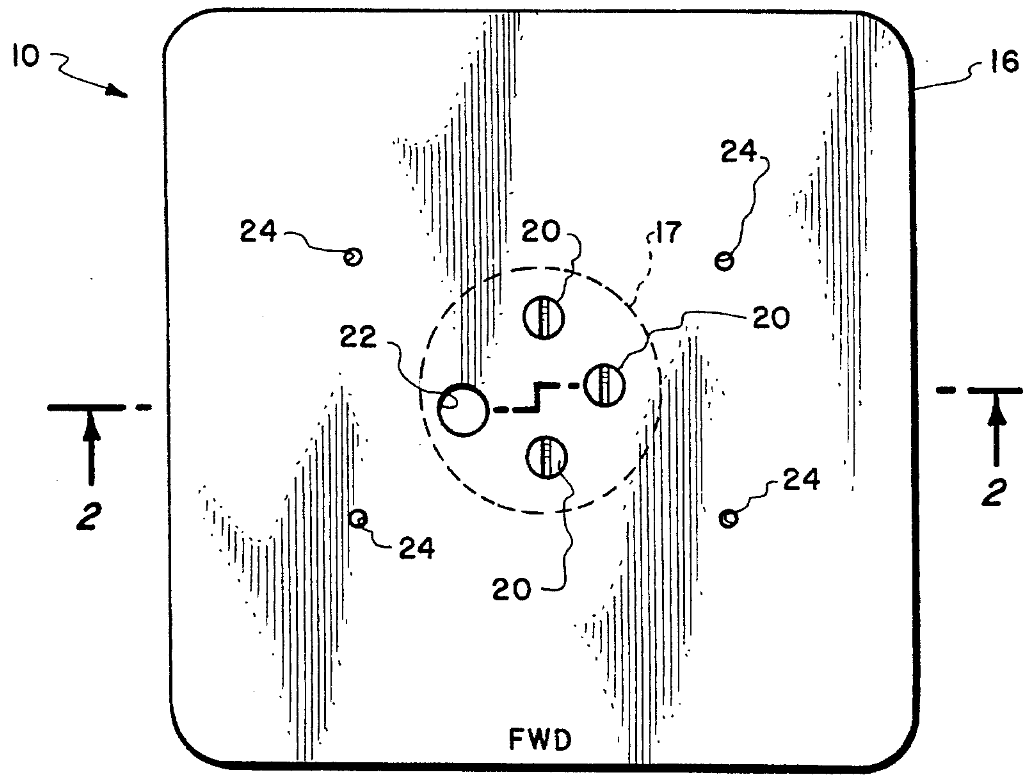
FIG. 1 is a top view of the mounting bracket of the present invention upon which the GPS antenna is mounted.
Figure 2:
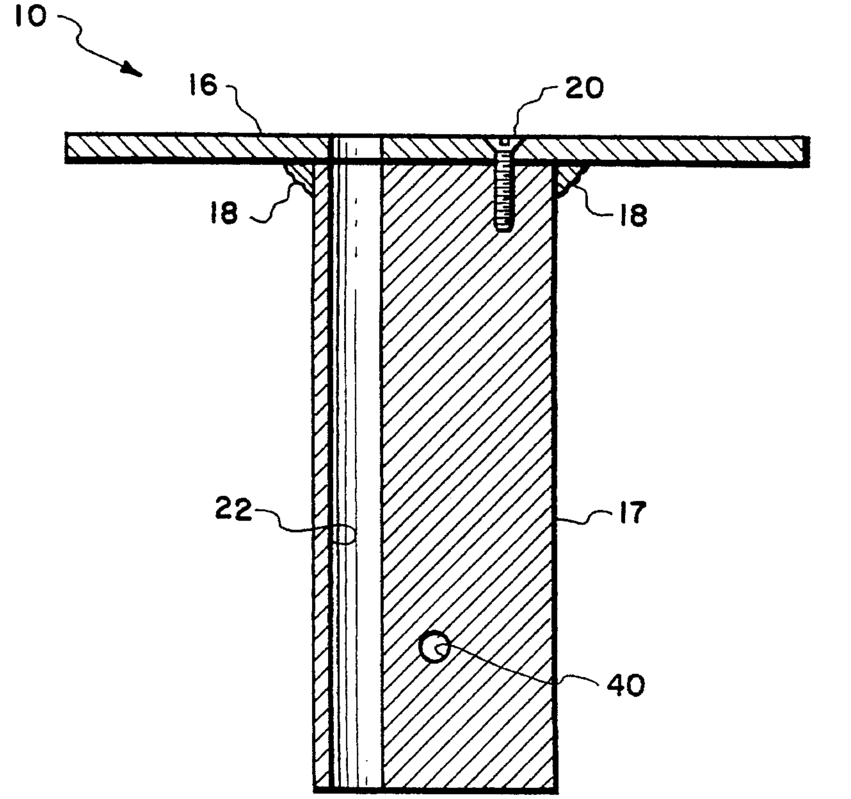
FIG. 2 is view taken along line 2—2 of the mounting bracket of the present invention.
Figure 4:
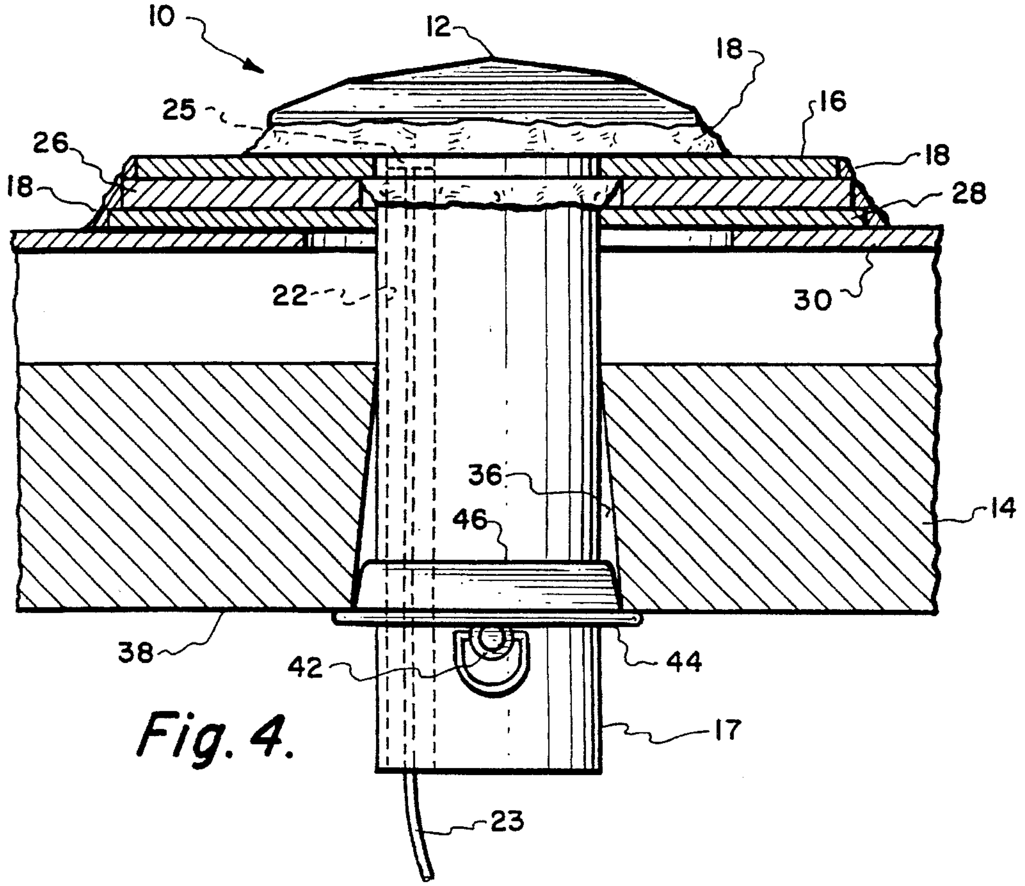
FIG. 4 illustrates the means by which the mounting bracket of the present invention is secured to the airframe of an aircraft.

Referring first to FIGS. 1, 2 and 4, there is shown the mounting bracket, designated generally by the reference numeral 10, which secures an antenna 12 to the airframe 14, of a fixed wing aircraft. Antenna 12 may be, for example, a Model TNL 1000 GPS antenna manufactured by Trimble Navigation. The GPS antenna 12 receives signals from GPS transmitting satellites and communicates with a receiver, not shown, which determines the position of the aircraft.

Mounting bracket 10 comprises a rectangular shaped mounting plate 16 which has antenna 12 mounted on its top surface as is best illustrated in FIG. 4. There is extending from the bottom surface of mounting plate 16 a cylindrical shaped member 17 which is positioned at the center of plate 16 and attached to the bottom surface of plate 16 by means of a weld 18 and a plurality of machine screws 20, with the heads of machine screws 20 being flush with the top surface of plate 16 as is best illustrated in FIG. 2. It should be noted that machine screws 20 are used to provide additional structural support for mounting bracket 10 to insure that plate 16 does not separate from member 17 while the aircraft is in flight and thus damage antenna 12.

In the preferred embodiment, rectangular shaped mounting plate 16 and cylindrical shaped member 17 are each fabricated from aluminum which is light weight, corrosion resistant and easily adapted for use with aircraft structures. Plate 16 has dimensions of six inches by six inches and a thickness of 0.190 inches, while member 17 has a diameter of 1.925 inches and a length of five inches.

There is an aperture 22 through plate 16 which extends the length of cylindrical shaped member 17. Antenna 12 has a coaxial electrical cable 23 extending downward from the bottom of antenna 12 through aperture 22 to the receiver of the Global Positioning System for the aircraft. Aperture 22 has a diameter of approximately 0.410 inches to accommodate within aperture 22 the coaxial electrical cable quick disconnect 25 of coaxial electrical cable 23. Disconnect 25 allows electrical cable 23 to be either connected to or disconnected from the electrical lead for antenna 12.

Referring to FIGS. 1 and 4, aperture 22 is positioned 2.35 inches from the left edge of plate 16 and 2.815 inches the bottom edge of plate 16 (marked FWD in FIG. 1), although it should be understood that the position of aperture may vary depending upon where cable 23 extends from antenna 12.

Rectangular shaped mounting plate 16 also has four antenna mounting holes 24 which align with mounting holes, not shown, in antenna 12 and allow antenna 12 to be secured to rectangular shaped plate by using screws and anchor nuts, bolts or the like, not shown.

Figure 3:
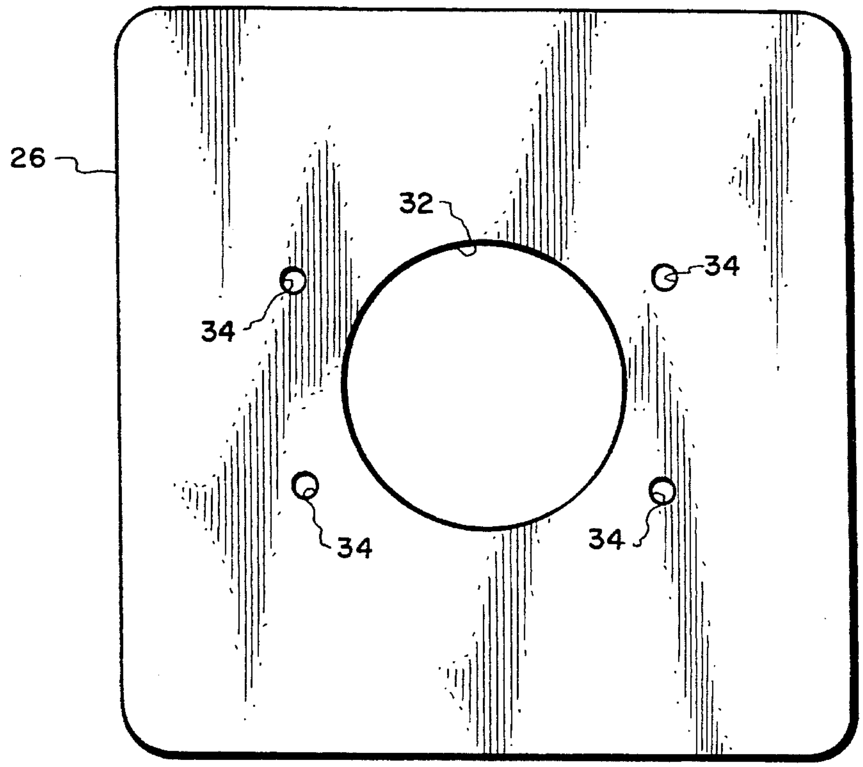
FIG. 3 illustrates the gaskets used with the mounting bracket of the present invention.

Referring to FIGS. 3 and 4, mounting bracket 10 includes a pair of gaskets 26 and 28 which are fabricated from a rubberized compound and which provide for an airtight, watertight seal between mounting plate 16 and the outer surface 30 of airframe 14. The following discussion will be with reference to gasket 26, but also applies to gasket 28. Gasket 26 is square shaped having edge dimensions of 6.25 inches and a thickness of approximately 0.25 inches. There is also positioned in the center of gasket 26 an aperture 32 which has a diameter of 2.425 inches and through which member 17 extends when mounting bracket 10 is secured to airframe 14. Gaskets 26 and 28 when positioned in the manner illustrated in FIG. 4 substantially reduce pressure loss within the interior of the aircraft.

There may also be four circular indents 34 positioned in gasket 26 with each circular indent 34 being aligned with one of the antenna mounting holes 24 of mounting plate 16. Indents 34 allow the anchor nuts and screws used to secure antenna 12 to mounting plate 16 to extend into gasket 26 without deforming gasket 26.

Gasket 28 is identical to gasket 26 except that gasket 28 is slightly larger having edge dimensions of 6.5 inches, a thickness of 0.141 inches and an aperture diameter of two inches. In addition, Gasket 28 does not include circular indents such as indents 34 in gasket 26.

Referring now to FIGS. 2 and 4 there is shown mounting bracket 10 secured to airframe 14 of the aircraft by placing member 17 within very pistol port 36 of the aircraft and allowing the bottom portion of member 17 to extend beyond the inner surface 38 of airframe 14. The bottom portion of member 17 includes a centrally located aperture 40 through which a quick release pin 42 is inserted to secure mounting bracket 10 to airframe 14. Since very pistol port 36 widens at its lower end a washer 44 positioned between pin 42 and surface 38 and a rubber gasket 46 placed at the bottom of port 36 seal the lower portion of member 17 to airframe 14. This sealing of the lower portion of member 17 assist in preventing pressure loss from within the aircraft and when used in combination with gaskets 26 and 28 eliminates any pressure lose within the interior of the aircraft.

It should be noted that the bracket of the present invention may be used to mount a GPS antenna at any location on the aircraft where there is a port extending to the interior of the aircraft such as the sextant port of the aircraft.

From the foregoing it may readily be seen that the present invention comprises a new, unique and exceedingly useful mounting bracket for mounting a GPS antenna to a fixed wing aircraft which constitutes a considerable improvement over the known prior art. Obviously many modifications and variations of the present invention may be made in light of the above teachings. It is therefore to be understood that within the scope of the appended claims the invention may be practiced otherwise than as specifically described.

What is claimed is:

1. A bracket for use in mounting, upon an airframe, an antenna including a coaxial electrical cable, comprising:

a rectangular shaped plate having a top surface and a bottom surface, said antenna being mounted on the top surface of said rectangular shaped plate;

a cylindrical shaped member attached to the bottom surface of said rectangular shaped plate, said cylindrical shaped member being positioned at the center of said rectangular shaped plate and extending from said rectangular shaped plate;

a first aperture extending through said rectangular shaped plate and said cylindrical shaped member, said first aperture being positioned to receive the coaxial electrical cable of said antenna;

said cylindrical shaped member having a second aperture at a bottom portion of said cylindrical shaped member, said second aperture being perpendicular to said first aperture and spaced apart from said first aperture;

said cylindrical shaped member extending through a port of said airframe, the bottom portion of said cylindrical shaped member extending beyond an inner surface of said airframe aligning said second aperture with the inner surface of said airframe;

a quick release pin inserted into said second aperture to secure said bracket to said airframe;

a pair of gaskets placed between the bottom surface of said rectangular shaped plate and an outer surface of said airframe, said pair of gaskets sealing said bracket to said airframe; and a washer positioned around an outer surface of said cylindrical shaped member between the inner surface of said airframe and said quick release pin.

2. The mounting bracket of claim 1 wherein said rectangular shaped plate is fabricated from aluminum.

3. The mounting bracket of claim 1 wherein said cylindrical shaped member is fabricated from aluminum.

4. The mounting bracket of claim 1 further comprising a plurality of machine screws for securing said cylindrical shaped member to the bottom surface of said rectangular shaped plate.

5. The mounting bracket of claim 1 further comprising a gasket positioned around the outer surface of said cylindrical shaped member and located within the port of said airframe.

* * * * *